L. H. Dwelley,
Turning Bungs.
N°. 59,567.  Patented Nov. 13, 1866.
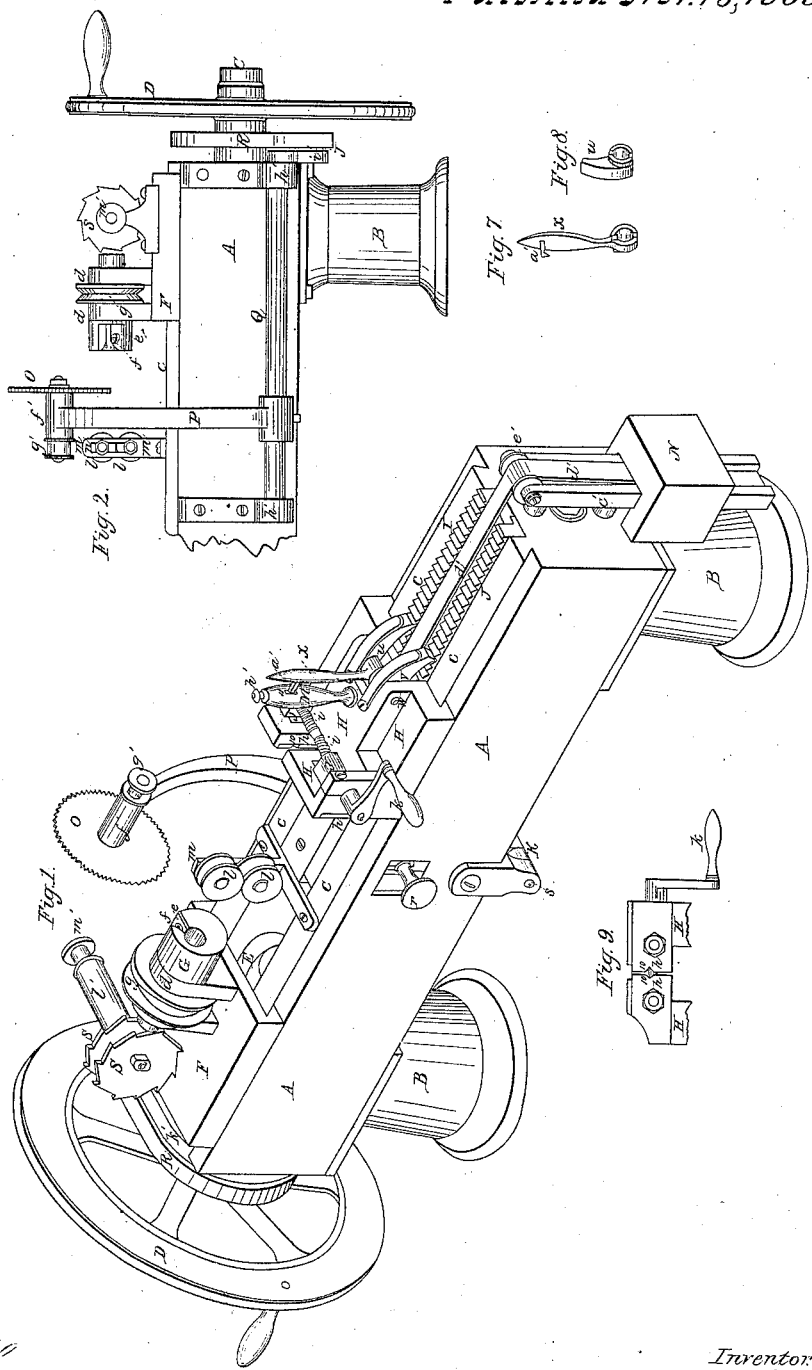
Witnesses.
Inventor
L. H. Dwelley.

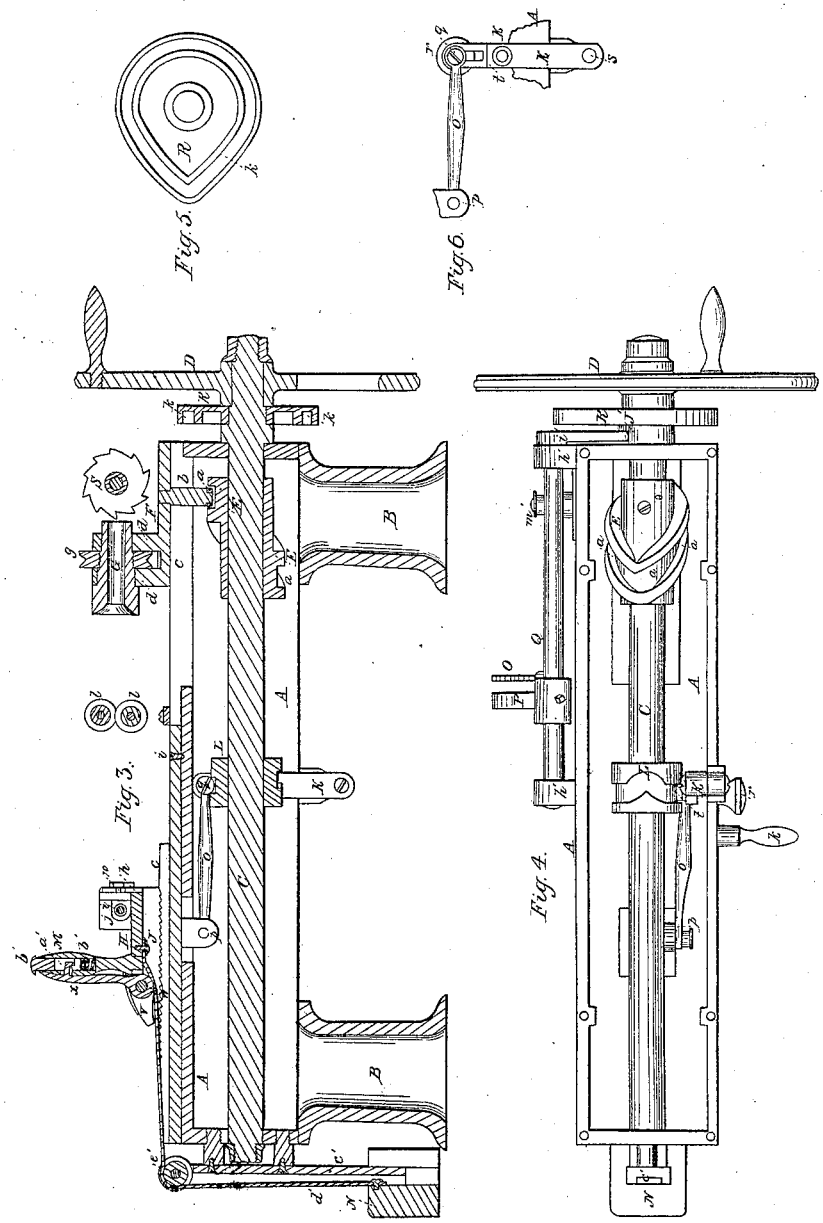

UNITED STATES PATENT OFFICE.

L. H. DWELLEY, OF DORCHESTER, MASSACHUSETTS.

IMPROVEMENT IN MACHINES FOR MAKING PLUGS FOR BARRELS.

Specification forming part of Letters Patent No. 59,567, dated November 13, 1866.

*To all whom it may concern:*

Be it known that I, LUCIUS H. DWELLEY, of Dorchester, in the county of Norfolk and State of Massachusetts, have invented a Machine for Making Barrel-Plugs, Pins, and other similar articles of wood, of which the following is a full, clear, and exact description, reference being had to the accompanying drawings, making part of this specification, in which—

Figure 1 is a perspective view of my improved machine. Fig. 2 is an elevation of a portion of one side of the machine. Fig. 3 is a longitudinal vertical section through the center of the machine. Fig. 4 is a plan of the under side of the machine, the hollow posts on which it is supported being removed; Figs. 5, 6, 7, 8, and 9, details to be referred to.

I am aware that a hollow arbor revolving in stationary bearings and provided with a cutter has been used for turning round sticks, such as hoe-handles, &c., where the stick to be turned was fed up to and through the arbor.

My invention, however, consists in a machine provided with a hollow arbor or cutter-head furnished with a cutter or cutters, and having a reciprocating as well as a rotary motion, so that it can be brought up to give the end of the stick the required form to make the plug or other article, and then be withdrawn to allow the article formed to be separated from the stick by means of a circular saw brought up at the required time; and my invention also consists in an improved device for feeding the stick forward after each operation of the cutting-off saw.

To enable others skilled in the art to understand and use my invention, I will proceed to describe the manner in which I have carried it out.

In the said drawings, A is the bed of the machine, which is supported on hollow posts B. C is the driving-shaft, which runs in suitable bearings in the ends of the bed A and carries the driving-wheel D. E is a cam-wheel on the shaft C, in the groove $a$ of which plays a roll on the end of a pin, $b$, projecting down from a carriage, F, which slides back and forth on ways $c$ on the top of the bed A. In bearings $d$, rising from this carriage, runs a hollow arbor or cutter-head, G, of the form shown in Figs. 1 and 3, which carries the cutters $e$, secured in place by a set-screw, $f$; and this arbor is revolved to give the required form to the end of the stick by a pulley, $g$, which is driven by a belt from a pulley. (Not shown.)

I will now describe the manner in which the stick is fed forward to be operated upon by the cutters $e$, which are so formed and adjusted as to give the required shape to the article to be made.

H is a carriage, which slides on the ways $e$, and is provided with sliding jaws $h$, Fig. 9, which are notched at 10 to receive the end of the stick, and are operated by a right-and-left screw-shaft, $i$, which passes through nuts $j$, projecting from the jaws through slots in the carriage H, and is furnished with a crank, $k$, as seen in Fig. 1.

The end of the stick to be operated upon is confined in place between these two jaws, while its opposite end is passed between the spring guide-rolls $l$, the shafts of which slide up and down in a vertical slot in the standard $m$, the upper shaft being forced toward the lower one by means of a spring, $n$, Fig. 2.

I J are two horizontal toothed bars, the former being stationary, while the latter is moved back and forth in suitable grooves in the bed A by means of a connecting-rod, $o$, Figs. 3, 4, and 6, one end of which is secured to a projection, $p$, on the under side of the bar J, its opposite end being attached by means of a screw, $q$, and thumb-nut, $r$, to a lever, K, which is pivoted at $s$, and carries a roll, $t$, Fig. 6, which works in the groove of the cam-wheel L on the driving shaft C.

The screw $q$ slides in a slot in the lever K, by which means the length of the stroke of the connecting-rod $o$ may be varied as desired.

$u$ $v$ are two spring-pawls, which are pivoted to the carriage H at $w$, and engage with the toothed bars I J, so that as the bar J is moved forward through the connections explained, the carriage is advanced by the pawl $v$ until the pawl $u$ catches into the next succeeding notch in the bar I, thus feeding forward the stick as required.

In case a greater amount of feed is required, the throw of the lever K is varied by means of the nut $r$ and screw $q$, as before explained, so as to cause the bar J to be carried forward a sufficient distance to allow the pawl $u$ to enter the second notch in the bar I, instead of the first, as before described.

The notches in the bars I J may, however, be made much finer, and the carriage be advanced one, two, or more notches at a time, in accordance with the amount of feed required.

The pawls $u$ $v$ act independently of each other, but are both raised out of the teeth of the bars I J by means of a lever, $x$, which acts on the pawls in a manner similar to a clutch, (see Figs. 7 and 8,) and is retained in position by a catch, $a'$, which enters a slot, 11, in a post, M, where it is held by a spring-catch, $b'$, as seen in Fig. 3. The carriage H is then free to be carried back by the weight N, which slides up and down on a guide-rod, $c'$, and has attached to it a strap, $d'$, which passes over a pulley, $e'$, and is secured at its opposite end to the carriage H; and as soon as the carriage is drawn back the catch $b'$ is pressed down to release the lever $x$ and allow the pawls $u$ $v$ to drop onto the toothed bars I J.

The finished article is severed from the stick by means of a circular cutting-off saw, O, the arbor of which runs in a bearing, $f'$, on the end of a bent arm, P, and carries a small pulley, $g'$, by which it is revolved by a belt from another pulley. (Not shown.)

The arm P is secured at its lower end to a horizontal rock-shaft, Q, which is supported in bearings $h'$ on the bed A, and carries at one end a crank, $i'$, having a roll, $j'$, at its outer end, which plays in the groove $k'$ of the cam-wheel R, Fig. 5, secured to the driving-shaft C, and thus as the cam-wheel R is revolved the shaft Q is rocked, so as to bring the saw O up to the stick at the required time on the withdrawal of the carriage F, with its rotary cutter-head G.

Some articles, such as pins for certain descriptions of curtain-rolls, &c., require to be furnished with a tenon at one end, and for this purpose I place two circular cutters, S, opposite to the end of the hollow arbor G, so that as soon as the end of the stick extends beyond the arbor it will come into contact with the cutters which form the tenon, as required. These cutters are secured to an arbor which runs in a bearing, $l'$, rising from the carriage F, and carries a small pulley, $m'$, driven by a belt. (Not shown in the drawings.)

Operation: The parts being in the position represented in Fig. 3, with the carriage H run back, the operator inserts the end of a stick between the jaws $h$ and clamps it in place by turning the crank $k$, as before described, and then passes the opposite end between the guide-rolls $l$.

The spring-catch $b'$ is now depressed to release the lever $x$ and allow the pawls $u$ $v$ to engage with the toothed bars I J, when the machine is set in operation and the stick fed forward, so as to project the required distance beyond the guide-rolls $l$.

The carriage F, with its rotary cutting-arbor G, is now brought forward by means of the cam-wheel E, so as to bring the cutters $e$ into contact with the end of the stick to give it the desired form to make the plug or other article, the hollow arbor passing over the stick as fast as it is cut; and if the article being made is of such length as to extend beyond the outer end of the hollow arbor G, and is to be furnished with a tenon, the cutters S are employed to effect this end. These cutters, however, may be removed from the machine when not required. The carriage F is now withdrawn and the cutting-off saw O brought up, as before explained, to sever the finished article from the end of the stick, which is then again fed forward, and the operation continues as before.

The feed of the carriage H is arrested automatically as soon as it has advanced so that the pawl $v$ arrives at that portion of the bar J not provided with teeth, thus avoiding the liability of injury to the machine; and on arriving at this point the pawls $u$ $v$ are raised out of contact with the toothed bars I J by means of the lever $x$, as described, when the weight N will immediately draw back the carriage into the position seen in Fig. 3, when another stick is placed in the machine and the operation is repeated as before.

What I claim as my invention, and desire to secure by Letters Patent, is—

1. In combination with the reciprocating hollow arbor G, the cutting-off saw O, brought up automatically at the required time by the means substantially as described.

2. The combination of the reciprocating toothed bar J, carriage H, pawls $u$ $v$, and stationary toothed bar I, when constructed and operating substantially as and for the purpose set forth.

3. The carriage H, provided with the automatic feed, constructed substantially as set forth, in combination with the reciprocating cutting-arbor G and the cutting-off saw O, all operating substantially as described.

4. The combination of the hollow post M, with its spring-catch $b'$, lever $x$, with its catch $a'$ and pawls $u$ $v$, all constructed and operating substantially as described, for the purpose set forth.

5. The cutters S, in combination with the reciprocating hollow arbor G and feeding device, when operating substantially as set forth.

L. H. DWELLEY.

Witnesses:
  P. E. TESCHEMACHER,
  N. W. STEARNS.